(12) United States Patent
Tsujimaru

(10) Patent No.: US 12,200,542 B2
(45) Date of Patent: *Jan. 14, 2025

(54) COMMUNICATION APPARATUS, PROCESSING APPARATUS, COMMUNICATION METHOD, AND STORAGE MEDIUM, FOR THROUGHPUT IMPROVEMENT OF WIRELESS NETWORKS

(71) Applicant: CANON KABUSHIKI KAISHA, Tokyo (JP)

(72) Inventor: Yuki Tsujimaru, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,320

(22) Filed: Nov. 16, 2023

(65) Prior Publication Data

US 2024/0163720 A1 May 16, 2024

Related U.S. Application Data

(63) Continuation of application No. 17/735,622, filed on May 3, 2022, now Pat. No. 11,843,973, which is a continuation of application No. PCT/JP2020/040266, filed on Oct. 27, 2020.

(30) Foreign Application Priority Data

Nov. 8, 2019 (JP) .................................. 2019-203513

(51) Int. Cl.
*H04W 28/06* (2009.01)
*H04L 1/00* (2006.01)
*H04W 84/12* (2009.01)

(52) U.S. Cl.
CPC .......... *H04W 28/06* (2013.01); *H04L 1/0068* (2013.01); *H04W 84/12* (2013.01)

(58) Field of Classification Search
None
See application file for complete search history.

(56) References Cited

U.S. PATENT DOCUMENTS 11,843,973 B2 * 12/2023 Tsujimaru ........... H04L 27/2602

FOREIGN PATENT DOCUMENTS

JP         2019506040 A      2/2019

* cited by examiner

*Primary Examiner* — Diane L Lo
(74) *Attorney, Agent, or Firm* — Canon U.S.A., Inc. IP Division

(57) ABSTRACT

A communication apparatus capable of performing wireless communication conforming to the IEEE 802.11 standard includes a transmission unit configured to transmit a wireless frame having preambles and data fields of a physical layer (PHY). The preambles include a Legacy Short Training Field (L-STF), a Legacy Long Training Field (L-LTF), a Legacy Signal Field (L-SIG), an Extremely High Throughput Signal A Field (EHT-SIG-A), an EHT Short Training Field (EHT-STF), and an EHT Long Training Field (EHT-LTF). The EHT-SIG-A includes information about Preamble Puncturing in a case where a 320 MHz frequency bandwidth is to be used by the communication apparatus.

14 Claims, 6 Drawing Sheets

COMMUNICATION APPARATUS, PROCESSING APPARATUS, COMMUNICATION METHOD, AND STORAGE MEDIUM, FOR THROUGHPUT IMPROVEMENT OF WIRELESS NETWORKS

CROSS-REFERENCE TO RELATED APPLICATIONS

This application is a Continuation of U.S. patent application Ser. No. 17/735,622, filed on May 3, 2022, which is a Continuation of International Patent Application No. PCT/JP2020/040266, filed Oct. 27, 2020, which claims the benefit of Japanese Patent Application No. 2019-203513, filed Nov. 8, 2019. These documents are hereby incorporated by reference herein in their entireties.

BACKGROUND OF THE INVENTION

Field of the Invention

The present invention relates to a communication apparatus that performs wireless communication, a communication method, and a storage medium.

Background Art

In recent years, the Wireless Local Area Network (hereinafter referred to as WLAN) technology has achieved throughput improvement for data communication, and, at present, diverse technical developments are actively being performed.

The IEEE 802.11 Series standard is known as one of WLAN communication standards including IEEE 802.11a/b/g//n/ac/ax. The latest standard IEEE 802.11ax utilizes the Orthogonal Frequency-Division Multiple Access (OFDMA) technique. This implements the transmission rate improvement under a congestion situation in addition to a high peak throughput of up to 9.6 gigabits/s (Gbps) (see Patent Document 1). The IEEE 802.11be standard has been studied as a succeeding standard aiming for the further throughput improvement.

There has been a study on the extending the maximal value of the frequency bandwidth of the electric wave from conventional 160 MHz to 320 MHz as a method for achieving the throughput improvement intended by IEEE 802.11be.

Further, there has been a study on the use of a technique called Preamble Puncturing to efficiently use frequency bands. If some of the target frequency bandwidths are unapplicable, this technique performs communication by using the remaining frequency bandwidths other than the unapplicable frequency bandwidths.

As described above, in IEEE 802.11be, there has been a study on extending the applicable frequency bandwidth to 320 MHz. However, in IEEE 802.11ax as the conventional wireless Local Area Network (LAN) standard, Preamble Puncturing has been able to be applied for up to the 160 MHz frequency bandwidth.

CITATION LIST

Patent Literature

PTL 1: U.S. Patent Application Publication No. 2018-50133

SUMMARY OF THE INVENTION

The present invention is directed to using Preamble Puncturing in frequency bandwidths wider than 160 MHz in wireless LAN communication. In view of the above, according to an aspect of the present invention, a communication apparatus capable of performing wireless communication conforming to an IEEE 802.11 standard includes a transmission unit configured to transmit a wireless frame having preambles and data fields of a physical layer (PHY), wherein the preambles include a Legacy Short Training Field (L-STF), a Legacy Long Training Field (L-LTF), a Legacy Signal Field (L-SIG), an Extremely High Throughput Signal A Field (EHT-SIG-A), an EHT Short Training Field (EHT-STF), and an EHT Long Training Field (EHT-LTF), and wherein the EHT-SIG-A includes information about Preamble Puncturing in a case where a 320 MHz frequency bandwidth is to be used by the communication apparatus.

Further features of the present invention will become apparent from the following description of exemplary embodiments with reference to the attached drawings.

DESCRIPTION OF THE EMBODIMENTS

Exemplary embodiments of the present invention will be described in detail below with reference to the accompanying drawings.

Figure 1:
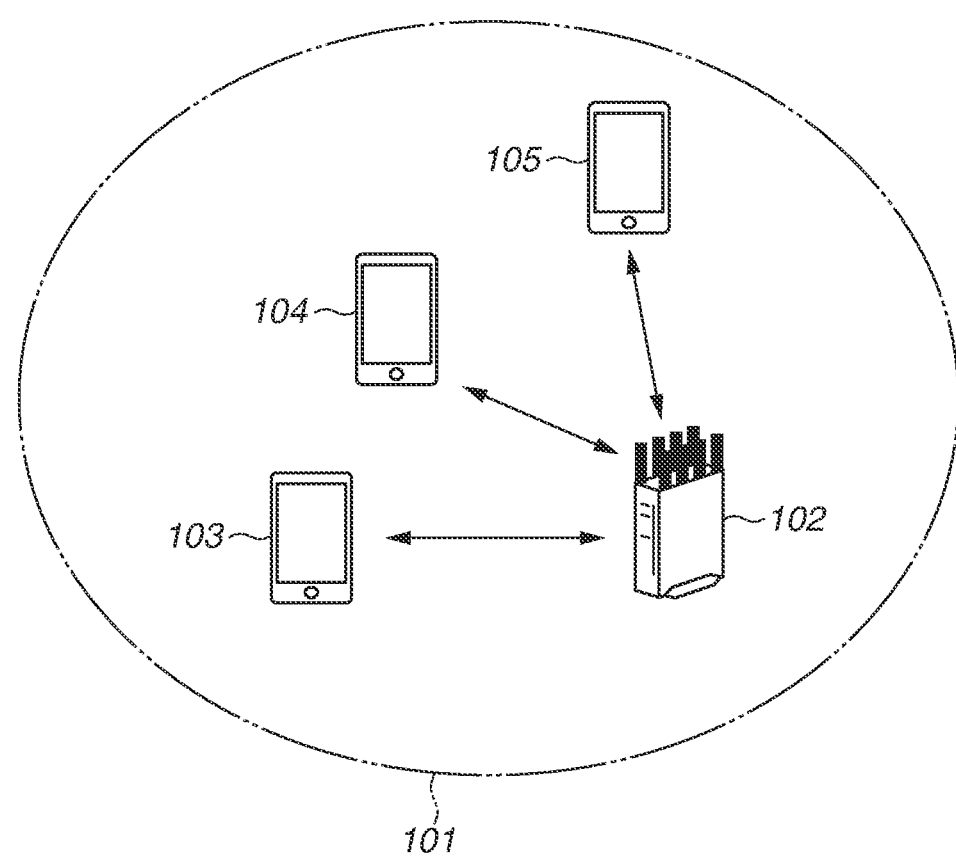
FIG. 1 illustrates an example of a configuration of a network according to the present exemplary embodiment.

FIG. 1 illustrates an example of a network configuration according to the present exemplary embodiment. A wireless network 101 in FIG. 1 includes an access point (hereinafter referred to as an AP) 102 and a plurality of stations (hereinafter referred to as STAs) 103, 104, and 105. For example, the AP 102 is an access point conforming to the IEEE 802.11 standard and includes a Group Owner (hereinafter referred to as a GO) conforming to the Wi-Fi Direct standard. When the AP 102 is a GO, the plurality of stations (STAs 103 to 105) is also referred to as Clients.

The AP 102 configures the wireless network 101 conforming to the IEEE 802.11 standard and transmits a beacon including identification information for the wireless network. The dotted line enclosing the wireless network 101 in FIG. 1 indicates the coverage of the signal transmitted by the AP 102. The AP 102 can communicate with the STAs 103, 104, and 105 within the dotted line. The AP 102 may have a relay function.

When the AP 102 receives a Probe Request message transmitted from an STA, the AP 102 transmits a Probe Response message as a response. The Probe Response message includes identification information for the wireless network 101. Examples of pieces of the identification information for the wireless network 101 include Service Set Identifier (hereinafter referred to as an SSID).

The AP 102 also communicates with the STAs 103 to 105 according to a wireless communication method conforming to the IEEE 802.11be standard. The AP 102 establishes a wireless connection with the STAs 103 to 105 through a predetermined association process.

FIG. 1 illustrates an example of a network. For example, the following argument about the positional relations between various communication apparatuses is applicable to a network including a number of communication apparatuses in a wide range of regions.

Figure 2:
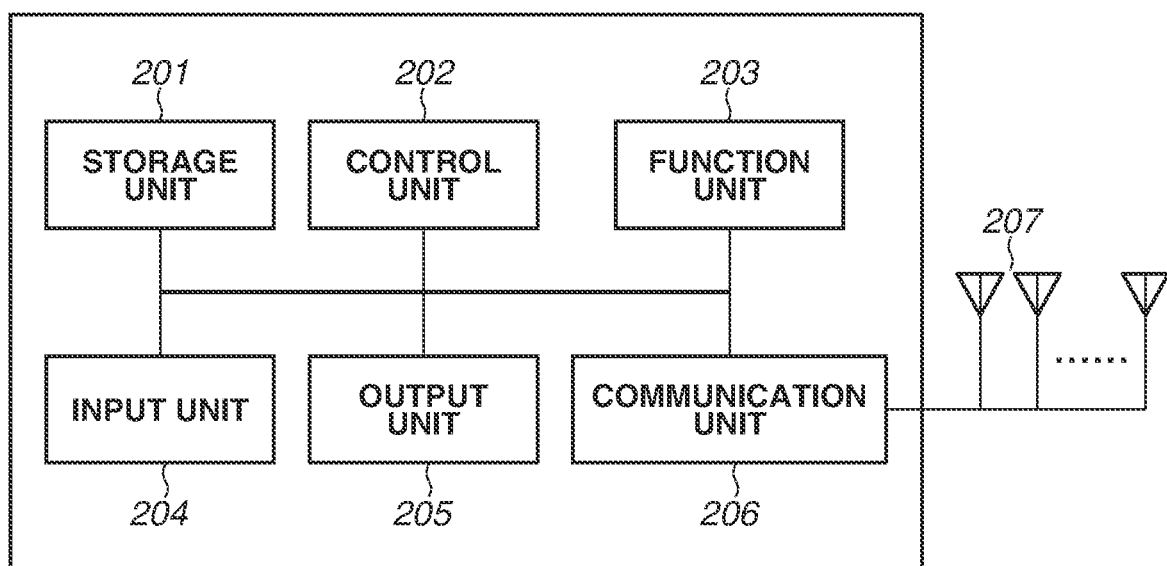
FIG. 2 illustrates an example of a hardware configuration of a communication apparatus according to the present exemplary embodiment.

FIG. 2 illustrates a hardware configuration of each of the AP 102 and the STAs 103 to 105 as a communication apparatus according to the present exemplary embodiment. The AP 102 according to the present exemplary embodiment may be not only an AP-dedicated apparatus, such as what is called a wireless Local Area Network (LAN) router, but also an apparatus such as a smart phone, camera, printer, or projector. The STAs 103 to 105 may also be an apparatus such as a smart phone, camera, printer, or projector. One communication apparatus may be provided with both an AP function and an STA function.

As an example of a hardware configuration, each of the AP 102 and the STAs 103 to 105 includes a storage unit 201, a control unit 202, a function unit 203, an input unit 204, an output unit 205, a communication unit 206, and an antenna 207.

The storage unit 201 includes both or either one of at least one read only memory (ROM) and at least one random access memory (RAM) for storing various kinds of information such as programs that perform various operations (described below) and communication parameters for wireless communication. The storage unit 201 may include memories (a ROM and a RAM) and storage media such as a flexible disk, hard disk, optical disk, magneto-optical (MO) disk, compact disc read only memory (CD-ROM), compact disc recordable (CD-R), magnetic tape, nonvolatile memory card, and digital versatile disc (DVD).

The control unit 202 includes, for example, at least one processor such as a Central Processing Unit (CPU) or a Micro Processing Unit (MPU), an Application Specific Integrated circuit (ASIC), a Digital Signal Processor (DSP), and a Field Programmable Gate Array (FPGA). The CPU is an abbreviation for Central Processing Unit, and the MPU is an abbreviation for Micro Processing Unit. The control unit 202 controls the entire apparatus by executing programs stored in the storage unit 201. The control unit 202 may control the entire apparatus through the collaboration of programs and an Operating System (OS) stored in the storage unit 201.

The control unit 202 controls the function unit 203 to perform image capturing, printing, projection, and other predetermined processing. The function unit 203 is a hardware component that enables the AP 102 or each STA to perform predetermined processing. For example, when the AP 102 or each STA is a camera, the function unit 203 is an imaging unit that performs image capture processing. For example, when the AP 102 or each STA is a printer, the function unit 203 is a printing unit that performs print processing. For example, when the AP 102 or each STA is a projector, the function unit 203 is a projection unit that performs projection processing. Data processed by the function unit 203 may be data stored in the storage unit 201 or data received through communication with other APs or STAs via the communication unit 206 (described below).

The input unit 204 receives various operations from the user. The output unit 205 outputs various kinds of data to the user. Data output by the output unit 205 includes at least one of screen display, audio output from a speaker, and vibration output. The input unit 204 and the output unit 205 may be implemented as one module, such as a touch panel.

The communication unit 206 is what is called a wireless LAN chip that controls wireless communication conforming to the IEEE 802.11 standard series and controls Internet Protocol (IP) communication. According to the present exemplary embodiment, the communication unit 206 can perform communication processing conforming to at least the IEEE 802.11be standard. The communication unit 206 is a processing apparatus that generates a Physical layer (PHY) Protocol Data Unit (PPDU) conforming to the IEEE 802.11 standard series. Alternatively, the communication unit 206 is a processing apparatus that receives and processes a PPDU generated by other apparatuses. The communication unit 206 according to the present exemplary embodiment generates or processes various PPDUs (described below). The communication unit 206 controls the antenna 207 to transmit and receive wireless communication signals for wireless communication. The AP 102 or each STA communicates contents such as image data, document data, and video data with other communication apparatuses via the communication unit 206. Each member of the antenna 207 can receive signals of a sub GHz band (any one of the 2.4, 5, and 6 GHz bands). The antenna 207 may physically include two or more antennas to perform multiple-input and multiple-output (MIMO) communication.

Figure 3:
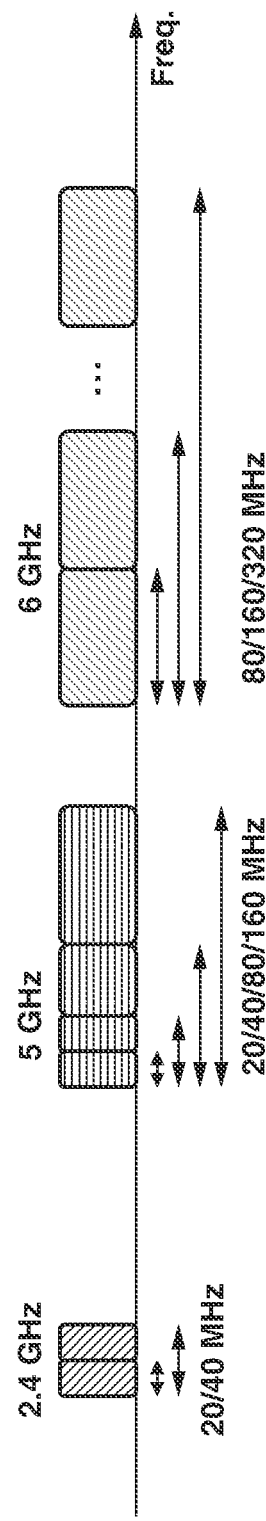
FIG. 3 illustrates an example of a frequency band configuration used in wireless communication according to the present exemplary embodiment.

FIG. 3 illustrates the frequency band configuration used in wireless communication according to the present exemplary embodiment. In the 2.4 GHz band used for a wireless LAN, the 20 or 40 MHz frequency bandwidth is applicable. Likewise, in the 5 GHz band used for a wireless LAN, the 20, 40, 80, or 160 MHz frequency bandwidth is applicable.

According to the present exemplary embodiment, further, the 5.925 to 7.125 GHz frequency band, what is called the 6 GHz band is applicable. In the 6 GHz band, the 320 MHz bandwidth is also applicable in addition to the 20, 40, 80, and 160 MHz frequency bandwidths. FIG. 3 illustrates an example of a frequency band configuration. Frequency bands other than the above-described ones may be applicable, and the 320 MHz bandwidth may also be applicable in the 5 GHz band.

Figure 4:
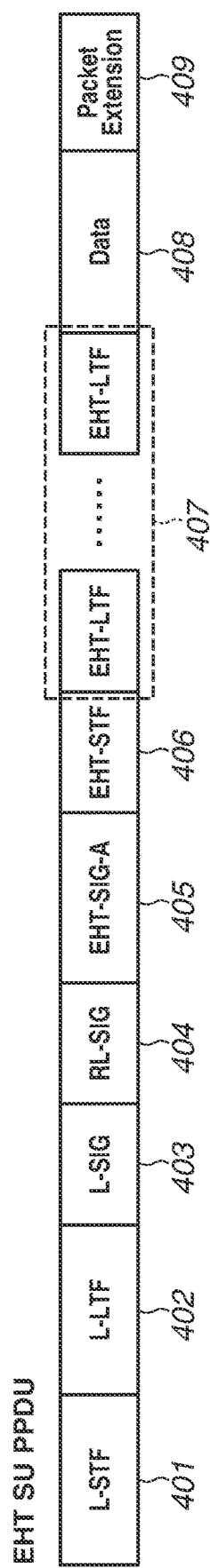
FIG. 4 illustrates an example of a Physical layer (PHY) frame structure of an Extremely High Throughput (EHT) Single User (SU) Physical layer Protocol Data Unit (PPDU) according to the present exemplary embodiment.
Figure 5:
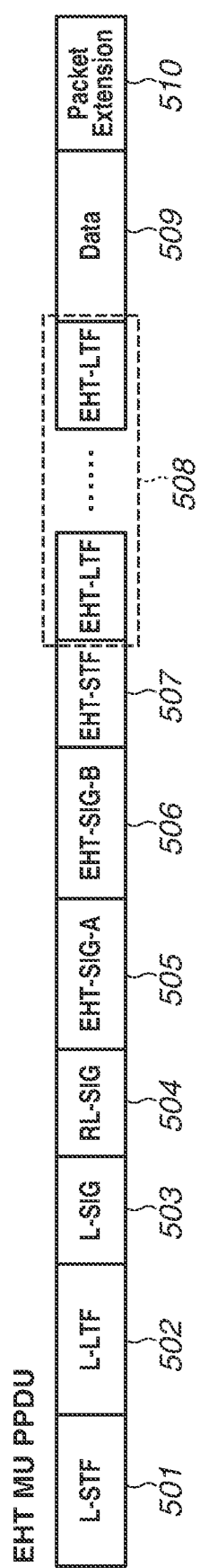
FIG. 5 illustrates an example of a PHY frame structure of an EHT Multi User (MU) PPDU according to the present exemplary embodiment.
Figure 6:
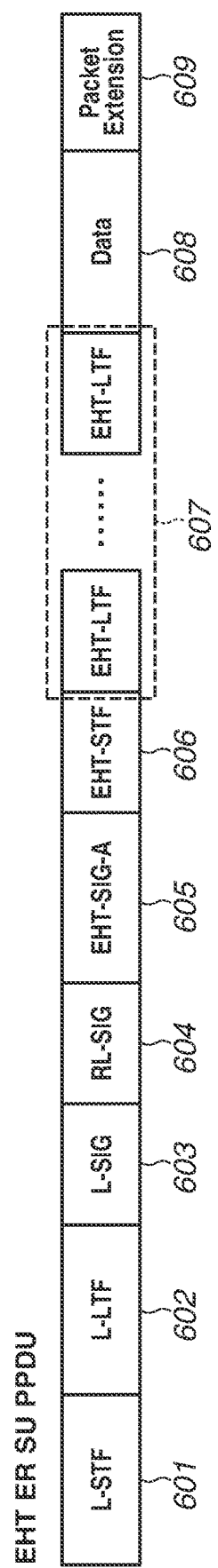
FIG. 6 illustrates an example of a PHY frame structure of an EHT Extended Range (ER) PPDU according to the present exemplary embodiment.

FIGS. 4 to 6 illustrate examples of wireless frames, i.e., frame formats of an Extremely High Throughput (EHT) Single User (SU) Physical layer Protocol Data Unit (PPDU), an EHT Multi User (MU) PPDU, and an EHT Extended Range (ER) PPDU, conforming to the IEEE 802.11be standard according to the present exemplary embodiment. The EHT is an abbreviation for Extremely High Throughput. These PPDUs include the preamble portion, the data fields, and the Packet Extension portion of the physical layer (PHY). The preamble of a PPDU includes fields 401 to 407 (501 to 508 or 601 to 607). Various kinds of data in the Media Access Control (MAC) layer and higher-level layers are stored in data fields 408, 509, and 608. FIGS. 4 to 6 illustrate examples of frame formats. Each PPDU may include fields other than the following fields, and some fields may be omitted. The order of the fields is not limited to the order illustrated in FIGS. 4 to 6.

Information included in each PPDU includes a Short Training Field (STF), a Long Term Field (LTF), and a Signal Field (SIG).

The head portion of the PPDU includes a Legacy-STF (L-STF) 401, a Legacy-LTF (L-LTF) 402, and a Legacy-Signal (L-SIG) 403 having backward compatibility with the IEEE 802.11a/b/g/n/ac/ax standard.

The L-STF 401 is used to perform PHY frame signal detection, automatic gain control (AGC), and timing detection. The L-LTF 402 is used for high-precision frequency/time synchronization, channel state information (CSI) acquisition, and the like. The L-SIG 403 is used to transmit control information including information about the communication rate and length.

A legacy device conforming to the IEEE 802.11a/b/g/n/aciax standard is capable of decoding data of the above-described various legacy fields.

The EHT SU PPDU in FIG. 4 is a PPDU used for Single User communication (between the AP 102 and a single STA). The EHT SU PPDU includes the L-STF 401, the L-LTF 402, the L-SIG 403, a Repeated Legacy Signal (RL-SIG) 404, an Extremely High Throughput-Signal-A (EHT-SIG-A) 405, an Extremely High Throughput-Short Training Field (EHT-STF) 406, and an Extremely High Throughput-Long Training Field (EHT-LTF) 407 as preambles. The EHT SU PPDU further includes the data field 408 and a Packet Extension 409.

An EHT ER SU PPDU in FIG. 6 uses a PPDU used for an Extended Range (when extending the communication range) in communication between the AP 102 and a single STA. The EHT ER SU PPDU includes the L-STF 601, the L-LTF 602, the L-SIG 603, the RL-SIG 604, the EHT-SIG-A 605, the EHT-STF 606, and the EHT-LTF 607 as preambles. The EHT ER SU PPDU further includes the data field 608 and the Packet Extension 609. To extend the communication range, the EHT ER SU PPDU is different from the EHT SU PPDU in that the applicable MCS (modulation method and coding rate) is limited.

As illustrated in Tables 1 and 2, the EHT-SIG-As 405 and 605 included in the EHT SU PPDU and the EHT ER SU PPDU include information about the EHT-SIG-A1 and the EHT-SIG-A2 necessary for the reception of the PPDU.

According to the present exemplary embodiment, information about the frequency bandwidth to be used and Preamble Puncturing is indicated by the Bandwidth field of the EHT-SIG-A1. For example, the value 0 of the Bandwidth field indicates the use of the 20 MHz bandwidth, the value 1 indicates the use of the 40 MHz bandwidth, the value 2 indicates the use of the 80 MHz bandwidth, the value 3 indicates the use of the 160 MHz bandwidth, and the value 4 indicates the use of the 320 MHz bandwidth. These values indicate that the Preamble Puncturing mode is not to be used. The value 5 of the Bandwidth field indicates that only secondary 20 MHz is subjected to puncturing in 80 MHz Preamble Puncturing. A frequency band subjected to puncturing means that the frequency band is not to be used. The value 6 of the Bandwidth field indicates that either one of two 20 MHz of secondary 40 MHz is subjected to puncturing in 80 MHz Preamble Puncturing. The value 7 of the Bandwidth field indicates that only secondary 20 MHz is subjected to puncturing in 160 (or 80+80) MHz Preamble Puncturing. The value 8 of the Bandwidth field indicates that at least one 20 MHz other than primary 40 MHz is subjected to puncturing in 160 (or 80+80) MHz Preamble Puncturing. The value 9 of the Bandwidth field indicates that only secondary 20 MHz is subjected to puncturing in 320 MHz Preamble Puncturing. The value 10 of the Bandwidth field indicates that either one of two 20 MHz of secondary 40 MHz is subjected to puncturing in 320 MHz Preamble Puncturing. The value 11 of the Bandwidth field indicates that at least one 20 MHz other than primary 80 MHz is subjected to puncturing in 320 MHz Preamble Puncturing. To indicate these pieces of information, at least 4 bits are assigned to the Bandwidth field of the EHT-SIG-A1. The above-described correspondence relation between the value of the Bandwidth field and the assignment of the frequency band subjected to puncturing is to be considered as an example. Assignments other than the above-described ones are applicable as long as they are related to the 320 MHz bandwidth. Names, bit positions, and sizes for each field are not limited to the values illustrated in Tables 1 and 2. Similar information may be stored with different field names, orders, and sizes.

TABLE 1

| | Bit Position | Sub Field | No. of Bits | Description |
|---|---|---|---|---|
| | | | | [Table 1] |
| EHT-SIG-A1 | B0 | Format | 1 | 1 when "EHT PPDU and EHT ER PPDU" is specified to distinguish from EHT TB PPDU. |
| | B1 | Beam Change | 1 | 1 when pre-EHT of PPDU is disposed in a space different from first symbol of EHT-LTF, or 0 when it is similarly mapped. |
| | B2 | UL/DL | 1 | Indicates whether PPDU is for UL or for DL, and is set to the same value as TXVECTOR UPLINK_FLAG. |
| | B3-B6 | MCS | 4 | Value of Modulation and Coding Scheme<br>For EHT SU PPDU: n = 0, 1, 2, . . . 11 (12 to 15 are reserved)<br>For EHT ER SU PPDU and Bandwidth = 0: n = 0, 1, 2 (3 to 15 are reserved)<br>For EHT ER SU PPDU and Bandwidth = 1: For MCS 0, n = 0 (1 to 15 are reserved) |
| | B7-B12 | BSS Color | 6 | A 6-bit number that identifies BSS |
| | B13-B16 | Spatial Reuse | 4 | Indicates whether Spatial Reuse is permitted during transmission of this PPDU. Value of Spatial Reuse field encoding illustrated in different table is set. |
| | B17-B20 | Bandwidth | 4 | 0 for 20 MHz<br>1 for 40 MHz<br>2 for 80 MHz<br>3 for 160 MHz (80 + 80 MHz)<br>4 for 320 MHz<br>5 when only secondary 20 MHz is subjected to puncturing in 80 MHz Preamble Puncturing. |

TABLE 1-continued

| Bit Position | Sub Field | No. of Bits | Description |
|---|---|---|---|
| | | | 6 when either one of two 20 MHz of secondary 40 MHz is subjected to puncturing in 80 MHz Preamble Puncturing.<br>7 when only secondary 20 MHz is subjected to puncturing in 160 (or 80 + 80) MHz Preamble Puncturing.<br>8 when at least one 20 MHz other than primary 40 MHz is subjected to puncturing in 160 (or 80 + 80) MHz Preamble Puncturing.<br>9 when only secondary 20 MHz is subjected to puncturing in 320 MHz Preamble Puncturing.<br>10 when either one of two 20 MHz of secondary 40 MHz is subjected to puncturing in 320 MHz Preamble Puncturing.<br>11 when at least one 20 MHz other than primary 80 MHz is subjected to puncturing in 320 MHz Preamble Puncturing.<br>12 to 15 are reserved. |

[Table 2]

| Bit Position | Sub Field | No. of Bits | Description |
|---|---|---|---|
| B21-B22 | GI + LTF Size | 2 | Indicates Guard Interval and size of EHT-LTF.<br>0 for 1xEHT-LTF and 0.8 μs GI<br>1 for 2xEHT-LTF and 0.8 μs GI<br>2 for 2xEHT-LTF and 1.6 μs GI<br>3 for both DCM and STBC fields of 1, and 4xEHT-LTF, and 0.8 μs GI<br>3 for 4xEHT-LTF and 3.2 μs GI in other cases |
| B23-B25 | NSTS And Midamble Periodicity | 3 | Number of space-time streams and midamble interval for frame synchronization<br>When Doppler field is 0: Number of space-time streams - 1<br>When Doppler field is 1: B23 to B24 indicate the number of space-time streams.<br>B25 is 0 when midamble interval is 10, or 1 when it is 20. |

TABLE 2

| | Bit Position | Sub Field | No. of Bits | Description |
|---|---|---|---|---|
| | | | | [Table 3] |
| EHT-SIG-A2 | B0-B6 | TXOP | 7 | Transmission Opportunity<br>127 when TXOP_DURATION of TXVECTOR is UNSPECIFIED and no interval information exists.<br>When TXOP_DURATION of TXVECTOR is smaller than 512, a value smaller than 127 is set to set NAV. In this case, when B0 is 0, B1 to B6 indicate FLOOR of TXOP_DURATION/8 (rounded off). When B0 is 1, B1 to B6 indicate FLOOR of (TXOP_DURATION-512)/8. |
| | B7 | Coding | 1 | 0 for Binary Convolutional Code (BCC), or 1 for Low Density Parity Check (LDPC) |
| | B8 | LDPC Extra Symbol Segment | 1 | Indicates presence or absence of extra OFDM symbol segment for LDPC. |
| | B9 | STBC | 1 | This field is 1 when Space-Time Block Coding (STBC) is used and DCM is 0.<br>1 when neither DCM nor STBC is applied. 0 for other cases. |
| | B10 | Beamformed | 1 | 1 when beamforming steering is applied to waveform of SU transmission. |
| | B11-B12 | Pre-FEC Padding Factor | 2 | 0, 1, 2, or 3 when Pre-FEC Padding Factor is 4, 1, 2, or 3, respectively. |
| | B13 | PE Disambiguity | 1 | Disambiguity field of Packet Extension |
| | B14 | DCM | 1 | Indicates whether Dual Carrier Modulation is applied to data field.<br>1 when STBC field is 0.<br>(When both DCM and STBC fields are 1, neither DCM nor STBC is applied.)<br>0 when DCM is not applied. |
| | B15 | Doppler | 1 | 1 when either one of the following conditions is satisfied:<br>* The number of OFDM symbols of data field is larger than "Value indicated by midamble interval + 1", and midamble exists.<br>* When the number of OFDM symbols of data field is equal to or less than "Value indicated by midamble interval + 1", and no midamble exists, and channel change is fast. |
| | | | | [Table 4] |
| | B16-B19 | CRC | 4 | CRC of EHT-SIG-A field so far (26 bits of A1 and 16 bits of up to B15 of A2, 42 bits in total) |
| | B20-B25 | Tail | 6 | 0 is set to indicate the end to trellis convolution decoder. |

The EHT MU PPDU in FIG. 5 is a PPDU used for Multi User communication (between the AP and a plurality of STAs). The EHT MU PPDU includes the L-STF 501, the L-LTF 502, the L-SIG 503, the RL-SIG 504, the EHT-SIG-A 505, the EHT-SIG-B 506, the EHT-STF 507, and the EHT-LTF 508 as preambles. The EHT MU PPDU further includes the data field 509 and the Packet Extension 510.

The EHT-SIG-A 505 includes information about the EHT-SIG-A1 and EHT-SIG-A2 necessary for the reception of the PPDU, as illustrated in Tables 3 and 4.

According to the present exemplary embodiment, information about the frequency bandwidth to be used and Preamble Puncturing is indicated by the Bandwidth field of the EHT-SIG-A1. For example, the value 0 of the Bandwidth field indicates the use of the 20 MHz bandwidth, the value 1 indicates the use of the 40 MHz bandwidth, the value 2 indicates the use of the 80 MHz bandwidth, the value 3 indicates the use of the 160 MHz bandwidth, and the value 4 indicates the use of the 320 MHz bandwidth. These values indicate that the Preamble Puncturing mode is not to be used. The value 5 of the Bandwidth field indicates that only secondary 20 MHz is subjected to puncturing in 80 MHz Preamble Puncturing. A frequency band subjected to puncturing means that the frequency band is not to be used. The value 6 of the Bandwidth field indicates that either one of two 20 MHz of secondary 40 MHz is subjected to puncturing in 80 MHz Preamble Puncturing. The value 7 of the Bandwidth field indicates that only secondary 20 MHz is subjected to puncturing in 160 (or 80+80) MHz Preamble Puncturing. The value 8 of the Bandwidth field indicates that at least one 20 MHz other than primary 40 MHz is subjected to puncturing in 160 (or 80+80) MHz Preamble Puncturing. The value 9 of the Bandwidth field indicates that only secondary 20 MHz is subjected to puncturing in 320 MHz Preamble Puncturing. The value 10 of the Bandwidth field indicates that either one of two 20 MHz of secondary 40 MHz is subjected to puncturing in 320 MHz Preamble Puncturing. The value 11 of the Bandwidth field indicates that at least one 20 MHz other than primary 80 MHz is subjected to puncturing in 320 MHz Preamble Puncturing. To indicate these pieces of information, at least 4 bits are assigned to the Bandwidth field of the EHT-SIG-A1. The above-described correspondence relation between the value of the Bandwidth field and the assignment of the frequency band subjected to puncturing is to be considered as an example. Assignments other than the above-described ones are applicable as long as they are related to the 320 MHz bandwidth. Names, bit positions, and sizes for each field are not limited to the values illustrated in Tables 1 and 2. Similar information may be stored with different field names, orders, and sizes.

As described above, the EHT SU PPDU, the EHT ER SU PPDU, and the EHT MU PPDU conforming to the IEEE 802.11be standard enable implementing Preamble Puncturing by specifying a frequency band exceeding 160 MHz. In the above descriptions, the information about the Bandwidth field is the same for the EHT SU PPDU, the EHT ER SU PPDU, and the EHT MU PPDU. However, the correspondence relation between the value of the Bandwidth field and the assignment of the frequency band subjected to puncturing may be different between the SU PPDU and the MU PPDU. When the MU PPDU (multi user communication) performs Preamble Puncturing, for example, communication bands can be assigned to different users (STAs) for each frequency width in 20 MHz units. For example, in the case of the MU PPDU (multi user communication), the number of frequency bands subjected to puncturing may be larger than that for the SU PPDU (single user communication) and the corresponding value of the Bandwidth field may be defined. This enables improving the degrees of freedom of using the frequency band in multi user communication in comparison with single user communication.

TABLE 3

| | Bit Position | Sub Field | No. of Bits | Description |
|---|---|---|---|---|
| | | | | [Table 5] |
| EHT-SIG-A1 | B0 | UL/DL | 1 | Indicates whether PPDU is for UL or for DL, and is set to the same value as TXVECTOR UPLINK_FLAG. |
| | B1-B3 | SIGBMCS | 3 | Indicates MCS of EHT-SIG-B field. 0, 1, 2, 3, 4, or 5 when MCS is 0, 1, 2, 3, 4, or 5, respectively. 6 and 7 are reserved. |
| | B4 | SIGBDCM | 1 | 1 when EHT-SIG-B field is modulated by DCM. |
| | B5-B10 | BSS Color | 6 | A 6-bit number that identifies BSS |
| | B11-B14 | Spatial Reuse | 4 | Indicates whether Spatial Reuse is permitted during transmission of this PPDU. Value of Spatial Reuse field encoding illustrated in different table is set. |
| | B15-B18 | Bandwidth | 3 | 0 for 20 MHz<br>1 for 40 MHz<br>2 for 80 MHz<br>3 for 160 MHz (80 + 80 MHz)<br>4 for 320 MHz<br>5 when only secondary 20 MHz is subjected to puncturing in 80 MHz Preamble Puncturing.<br>6 when either one of two 20 MHz of secondary 40 MHz is subjected to puncturing in 80 MHz Preamble Puncturing.<br>7 when only secondary 20 MHz is subjected to puncturing in 160 (or 80 + 80) MHz Preamble Puncturing.<br>8 when at least one 20 MHz other than primary 40 MHz is subjected to puncturing in 160 (or 80 +80) MHz Preamble Puncturing.<br>9 when only secondary 20 MHz is subjected to puncturing in 320 MHz Preamble Puncturing.<br>10 when either one of two 20 MHz of secondary 40 MHz is subjected to puncturing in 320 MHz Preamble Puncturing.<br>11 when at least one 20 MHz other than primary 80 MHz is subjected to puncturing in 320 MHz Preamble Puncturing.<br>12 to 15 are reserved. |

TABLE 3-continued

[Table 6]

| Bit Position | Sub Field | No. of Bits | Description |
|---|---|---|---|
| EHT-SIG-A1 B19-B22 | Number Of EHT-SIG-B Symbols or MU-MIMO Users | 4 | Indicates the number of OFDMA symbols of EHT-SIG-B when SIGB Compression field is 0.<br>The number of OFDM symbols of EHT-SIG-B minus 1 when the number of OFDM symbols of EHT-SIG-B is smaller than 16.<br>When at least one receiving station sets capacity for supporting the number of OFDM symbols of EHT SIG-B larger than 16 to 0, 15 is set to indicate that the number of OFDM symbols of EHT-SIG-B is 16.<br>15 is set to indicate that the number of OFDM symbols of EHT-SIG-B is equal to or larger than 16 when all of receiving stations set capacity for supporting the number of OFDM symbols of EHT SIG-B larger than 16 to 0, and data rate of EHT-SIG-B is smaller than that of MCS 4 that does not use DCM.<br>Means the number of MU-MIMO users minus 1 when SIGB Compression field is 1. |
| B23-B24 | GI + LTF Size | 2 | Indicates Guard Interval and size of EHT-LTF.<br>0 for 4xEHT-LTF and 0.8 µs GI<br>1 for 2xEHT-LTF and 0.8 µs GI<br>2 for 2xEHT-LTF and 1.6 µs GI<br>3 for 4xEHT-LTF and 3.2 µs GI |
| B25 | Doppler | 1 | 1 when either one of the following conditions is satisfied:<br>* The number of OFDM symbols of data field is larger than "Value indicated by midamble interval + 1", and midamble exists.<br>* When the number of OFDM symbols of data field is equal to or less than "Value indicated by midamble interval + 1", and no midamble exists, and channel change is fast. |

TABLE 4

[Table 7]

| Bit Position | Sub Field | No. of Bits | Description |
|---|---|---|---|
| EHT-SIG-A2 B0-B6 | TXOP | 7 | Transmission Opportunity<br>127 when TXOP_DURATION of TXVECTOR is UNSPECIFIED and no interval information exists.<br>When TXOP_DURATION of TXVECTOR is smaller than 512, a value smaller than 127 is set to set NAV. In this case, when B0 is 0, B1 to B6 indicate FLOOR of TXOP_DURATION/8 (rounded off).<br>When B0 is 1, B1 to B6 indicate FLOOR of (TXOP_DURATION-512)/8. |
| B7 | SIG Compression | 1 | 1 when Common field exists in EHT-SIG-B. |
| B8-B10 | Number of EHT-LTF Symbols And Midamble Periodicity | 3 | Indicates the number of EHT-LTFs.<br>0 for 1EHT-LTF<br>1 for 2EHT-LTF<br>2 for 4EHT-LTF<br>3 for 6EHT-LTF<br>4 for 8EHT-LTF<br>When Doppler field is 1, B8 to B9 indicate the number of EHT-LTF symbols and B10 indicates midamble interval. |
| B11 | LDPC Extra Symbol Segment | 1 | Indicates presence or absence of extra OFDM symbol segment for LDPC. |
| B12 | STBC | 1 | When the number of users for each Resource Unit (RU) is not larger than 1, 1 is set to indicate encoding by STBC. |
| B13-B14 | Pre-FEC Padding Factor | 2 | 0, 1, 2, or 3 when Pre-FEC Padding Factor is 4, 1, 2, or 3, respectively |
| B15 | PE Disambiguity | 1 | Disambiguity field of Packet Extension |
| B16-B19 | CRC | 4 | CRC of EHT-SIG-A field so far (26 bits of A1 and 16 bits of up to B15 of A2, 42 bits in total) |
| B20-B25 | Tail | 6 | 0 is set to indicate the end to trellis convolution decoder. |

Modifications

In the above-described examples, information about Preamble Puncturing is indicated by the Bandwidth field of the EHT-SIG-A1. Then, 4 bits are assigned to the Bandwidth Field of the EHT-SIG-A1 to indicate information when the 320 MHz frequency bandwidth is to be used. In the following example, the Bandwidth field of the EHT-SIG-A1 is assigned 3 bits, the EHT-SIG-A3 field is separately added, and these fields indicate information about Preamble Puncturing.

The value 0 of the Bandwidth field of the EHT-SIG-A1 indicates that the 20 MHz frequency bandwidth is to be used. The value 1 of the Bandwidth field of the EHT-SIG-A1 indicates that the 40 MHz frequency bandwidth is to be used. The value 2 of the Bandwidth field of the EHT-SIG-A1 indicates that the 80 MHz frequency bandwidth is to be used. The value 3 of the Bandwidth field of the EHT-SIG-A1 indicates that the 160 MHz frequency bandwidth is to be used. The value 4 of the Bandwidth field of the EHT-SIG-A1 indicates that the 320 MHz frequency bandwidth is to be used. The values 0 to 4 of the Bandwidth field of the EHT-SIG-A1 indicate that Preamble Puncturing is not to be performed. The value 5 of the Bandwidth field of the EHT-SIG-A1 indicates that the 80 MHz frequency bandwidth is to be used and that Preamble Puncturing is to be performed. The value 6 of the Bandwidth field of the EHT-SIG-A1 indicates that the 160 MHz frequency bandwidth is to be used and that Preamble Puncturing is to be performed. The value 7 of the Bandwidth field of the EHT-SIG-A1 indicates that the 320 MHz frequency bandwidth is to be used and that Preamble Puncturing is to be performed. Further, in the case of the values 5 to 7 of the Bandwidth field of the EHT-SIG-A1, the EHT-SIG-A3 illustrated in Table 5 is to be included in the EHT-PPDU. Names, bit positions, and sizes for each field in FIG. 5 are to be considered as examples. As long as similar information is indicated, different names, positions, and sizes may be used.

The EHT-SIG-A3 illustrated in Table 5 includes the Preamble Puncturing field that indicates the frequency bandwidth subjected to Preamble Puncturing. The Preamble Puncturing field in Table 5 has a 16-bit length and is sequentially associated with the 20 MHz bandwidth from the bit position B0. When using the 20 MHz band, the corresponding bit is set to 0. Otherwise, i.e., Puncturing is to be performed, the corresponding bit is set to 1.

The definitions of 0 and 1 for each bit may be reversed. More specifically, in Table 5, the frequency band to be used is represented in the bitmap format.

For example, when the 80 MHz Frequency bandwidth is to be used, and only secondary 20 MHz is subjected to Puncturing, the value of the Bandwidth field of the EHT-SIG-A1 is 5. For the Preamble Puncturing field of the EHT-SIG-A3, only the B1 bit is set to 1 and other bits are set to 0. The bitmap may have a variable length according to the frequency bandwidth specified by the Bandwidth field of the EHT-SIG-A1. More specifically, the length of the bitmap may be 4 bits for the 80 MHz frequency bandwidth, 8 bits for the 160 MHz frequency bandwidth, and 16 bits for the 320 MHz frequency bandwidth. In this case, excessive high-order bits for the frequency bandwidth specified by the Bandwidth field of the EHT-SIG-A1 may be unused or reserved.

TABLE 5

[Table 8]

| | Bit Position | Sub Field | No. of Bits | Description |
|---|---|---|---|---|
| EHT-SIG-A3 | B0-B15 | Preamble Puncturing | 16 | Specifies frequency band subjected to Puncturing. Corresponds to whether frequency bandwidth sequentially delimited in 20 MHz steps from value of the lowest frequency of 320 MHz bandwidth from B0 is subjected to Puncturing. Frequency bandwidth is not subjected to Puncturing when the bit is 0 or is subjected to Puncturing when it is 1. |
| | B16-B19 | CRC | 4 | CRC of HE-SIG-A field so far |
| | B20-B25 | Tail | 6 | 0 is set to indicate the end to trellis convolution decoder. |

As yet another modification, the frequency band subjected to Preamble Puncturing may be indicated as follows instead of the example in Table 5. More specifically, the value 0 of the Preamble Puncturing field of the EHT-SIG-A3 indicates that all of the frequency bandwidths are to be used, i.e., Preamble Puncturing is not to be performed. The value 1 of the Preamble Puncturing field of the EHT-SIG-A3 indicates that the lowest frequency bandwidth 20 MHz is subjected to puncturing. The value 2 of the Preamble Puncturing field of the EHT-SIG-A3 indicates that 20 MHz from the lowest 20 Hz to 40 MHz frequency bandwidth is subjected to puncturing. The value 3 of the Preamble Puncturing field of the EHT-SIG-A3 indicates that 20 MHz from the lowest 40 Hz to 60 MHz frequency bandwidth is subjected to puncturing. The value of the Preamble Puncturing field of the EHT-SIG-A3 may be defined as above. However, the above-described examples may be other methods.

As discussed above, according to the present exemplary embodiment and each modification, Preamble Puncturing can be suitably performed even if the 320 MHz frequency bandwidth is to be used for wireless LAN communication. The AP 102 or each STA can generate the EHT-SIG-A field in the PPDU frame of the wireless LAN to perform appropriate Preamble Puncturing. By communicating these PPDU frames between the AP 102 and each STA, Preamble Puncturing can be suitably performed in wireless LAN communication between the AP 102 and each STA.

Other Exemplary Embodiments

The present invention can also be achieved when a program for implementing at least one of the functions according to the above-described exemplary embodiments is supplied to a system or apparatus via a network or storage medium, and at least one processor in the computer of the system or apparatus reads and executes the program. Further, the present invention can also be achieved by a circuit (for example, an application specific integrated circuit (ASIC)) that implements at least one function.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention makes it possible to use Preamble Puncturing also in frequency bandwidths wider than 160 MHz in wireless LAN communication.

The present invention makes it possible to use Preamble Puncturing also in frequency bandwidths wider than 160 MHz in wireless LAN communication.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus for performing wireless communication conforming to an IEEE 802.11 standard, comprising:
   a transmission unit configured to transmit a physical (PHY) frame including a preamble and a data field,
   wherein the preamble includes a Legacy Short Training Field (L-STF), a Legacy Long Training Field (L-LTF), a Legacy Signal Field (L-SIG), an EHT Short Training Field (EHT-STF), an EHT Long Training Field (EHT-LTF), and a signal field including a first field group and a second field group,
   wherein, in the preamble, the EHT-STF is located after the L-SIG, and the signal field is located between the L-SIG and the EHT-STF,
   wherein the first field group includes a field comprising three consecutive bits indicating a bandwidth and a field comprising six consecutive bits indicating BSS color information and the second field group comprising 26 bits includes a field comprising a predetermined number of consecutive bits indicating information regarding Puncturing and a field comprising four consecutive bits used for CRC; and
   wherein at least one of the predetermined number of consecutive bits indicating the information regarding Puncturing is information indicating whether to puncture a bandwidth of 20 MHz among bandwidth for communicating the PHY frame.

2. The communication apparatus according to claim 1, wherein the PHY frame includes EHT Multi User (MU) PPDU.

3. The communication apparatus according to claim 1, wherein the preamble further includes a Repeated Legacy Signal Field (RL-SIG) between the L-SIG and the signal field.

4. The communication apparatus according to claim 1, further comprising a plurality of antennas,
   wherein the transmission unit transmits the PHY frame via the plurality of antennas.

5. A communication apparatus for performing wireless communication conforming to an IEEE 802.11 standard, comprising:
   a transmission unit configured to transmit a physical (PHY) frame including a preamble and a data field,
   wherein the preamble includes a Legacy Short Training Field (L-STF), a Legacy Long Training Field (L-LTF), a Legacy Signal Field (L-SIG), an EHT Short Training Field (EHT-STF), an EHT Long Training Field (EHT-LTF), and a signal field including a first field group and a second field group,
   wherein, in the preamble, the EHT-STF is located after the L-SIG, and the signal field is located between the L-SIG and the EHT-STF,
   wherein the first field group includes a field comprising three consecutive bits indicating bandwidth and a field comprising six consecutive bits indicating BSS color information and the second field group comprising 26 bits includes a field comprising a predetermined number of consecutive bits indicating information regarding Puncturing and a field comprising four consecutive bits used for CRC, and
   wherein in a case where all of the predetermined number of consecutive bits are set 0 or 1, the information indicates that Puncturing is not performed in communication of the PHY frame.

6. The communication apparatus according to claim 5, wherein the PHY frame includes EHT Multi User (MU) PPDU.

7. The communication apparatus according to claim 5, wherein the preamble further includes a Repeated Legacy Signal Field (RL-SIG) between the L-SIG and the signal field.

8. The communication apparatus according to claim 5, further comprising a plurality of antennas,
   wherein the transmission unit transmits the PHY frame via the plurality of antennas.

9. A communication apparatus for performing wireless communication conforming to an IEEE 802.11 standard, comprising:
   a receiving unit configured to receive a physical (PHY) frame including a preamble and a data field,
   wherein the preamble includes a Legacy Short Training Field (L-STF), a Legacy Long Training Field (L-LTF), a Legacy Signal Field (L-SIG), an EHT Short Training Field (EHT-STF), an EHT Long Training Field (EHT-LTF), and a signal field including a first field group and a second field group,
   wherein, in the preamble, the EHT-STF is located after the L-SIG, and the signal field is located between the L-SIG and the EHT-STF,
   wherein the first field group includes a field comprising three consecutive bits indicating a bandwidth and a field comprising six consecutive bits indicating BSS color information and the second field group comprising 26 bits includes a field comprising a predetermined number of consecutive bits indicating information regarding Puncturing and a field comprising four consecutive bits used for CRC; and wherein at least one of the predetermined number of consecutive bits indicating the information regarding Puncturing is information indicating whether to puncture a bandwidth of 20 MHz among bandwidth for communicating the PHY frame.

10. A communication apparatus for performing wireless communication conforming to an IEEE 802.11 standard, comprising:

a receiving unit configured to receive a physical (PHY) frame including a preamble and a data field, wherein the preamble includes a Legacy Short Training Field (L-STF), a Legacy Long Training Field (L-LTF), a Legacy Signal Field (L-SIG), an EHT Short Training Field (EHT-STF), an EHT Long Training Field (EHT-LTF), and a signal field including a first field group and a second field group, wherein, in the preamble, the EHT-STF is located after the L-SIG, and the signal field is located between the L-SIG and the EHT-STF, wherein the first field group includes a field comprising three consecutive bits indicating bandwidth and a field comprising six consecutive bits indicating BSS color information and the second field group comprising 26 bits includes a field comprising a predetermined number of consecutive bits indicating information regarding Puncturing and a field comprising four consecutive bits used for CRC, and wherein in a case where all of the predetermined number of consecutive bits are set to 0 or 1, the information indicates that Puncturing is not performed in communication of the PHY frame.

11. A communication apparatus for performing wireless communication conforming to an IEEE 802.11 standard, comprising:

transmitting a physical (PHY) frame including a preamble and a data field, wherein the preamble includes a Legacy Short Training Field (L-STF), a Legacy Long Training Field (L-LTF), a Legacy Signal Field (L-SIG), an EHT Short Training Field (EHT-STF), an EHT Long Training Field (EHT-LTF), and a signal field including a first field group and a second field group, wherein, in the preamble, the EHT-STF is located after the L-SIG, and the signal field is located between the L-SIG and the EHT-STF, wherein the first field group includes a field comprising three consecutive bits indicating bandwidth and a field comprising six consecutive bits indicating BSS color information and the second field group comprising 26 bits includes a field comprising a predetermined number of consecutive bits indicating information regarding Puncturing and a field comprising four consecutive bits used for CRC, and wherein in a case where all of the predetermined number of consecutive bits are set to 0 or 1, the information indicates that Puncturing is not performed in communication of the PHY frame.

12. A non-transitory computer readable storage medium storing instructions for causing a communication apparatus to perform a process, the communication apparatus for performing wireless communication conforming to an IEEE 802.11 standard, and the process comprising:

transmitting a physical (PHY) frame including a preamble and a data field, wherein the preamble includes a Legacy Short Training Field (L-STF), a Legacy Long Training Field (L-LTF), a Legacy Signal Field (L-SIG), an EHT Short Training Field (EHT-STF), an EHT Long Training Field (EHT-LTF), and a signal field including a first field group and a second field group, wherein, in the preamble, the EHT-STF is located after the L-SIG, and the signal field is located between the L-SIG and the EHT-STF, wherein the first field group includes a field comprising three consecutive bits indicating bandwidth and a field comprising six consecutive bits indicating BSS color information and the second field group comprising 26 bits includes a field comprising a predetermined number of consecutive bits indicating information regarding Puncturing and a field comprising four consecutive bits used for CRC, and wherein in a case where all of the predetermined number of consecutive bits are set to 0 or 1, the information indicates that Puncturing is not performed in communication of the PHY frame.

13. A method for a communication apparatus for performing wireless communication conforming to an IEEE 802.11 standard, the method comprising:

receiving a physical (PHY) frame including a preamble and a data field, wherein the preamble includes a Legacy Short Training Field (L-STF), a Legacy Long Training Field (L-LTF), a Legacy Signal Field (L-SIG), an EHT Short Training Field (EHT-STF), an EHT Long Training Field (EHT-LTF), and a signal field including a first field group and a second field group, wherein, in the preamble, the EHT-STF is located after the L-SIG, and the signal field is located between the L-SIG and the EHT-STF, wherein the first field group includes a field comprising three consecutive bits indicating bandwidth and a field comprising six consecutive bits indicating BSS color information and the second field group comprising 26 bits includes a field comprising a predetermined number of consecutive bits indicating information regarding Puncturing and a field comprising four consecutive bits used for CRC, and wherein in a case where all of the predetermined number of consecutive bits are set to 0 or 1, the information indicates that Puncturing is not performed in communication of the PHY frame.

14. A non-transitory computer readable storage medium storing instructions for causing a communication apparatus to perform a process, the communication apparatus for performing wireless communication conforming to an IEEE 802.11 standard, and the process comprising:

receiving a physical (PHY) frame including a preamble and a data field, wherein the preamble includes a Legacy Short Training Field (L-STF), a Legacy Long Training Field (L-LTF), a Legacy Signal Field (L-SIG), an EHT Short Training Field (EHT-STF), an EHT Long Training Field (EHT-LTF), and a signal field including a first field group and a second field group, wherein, in the preamble, the EHT-STF is located after the L-SIG, and the signal field is located between the L-SIG and the EHT-STF, wherein the first field group includes a field comprising three consecutive bits indicating bandwidth and a field comprising six consecutive bits indicating BSS color information and the second field group comprising 26 bits includes a field comprising a predetermined number of consecutive bits indicating information regarding Puncturing and a field comprising four consecutive bits used for CRC, and wherein in a case where all of the predetermined number of consecutive bits are set to 0 or 1, the information indicates that Puncturing is not performed in communication of the PHY frame.

* * * * *